United States Patent
Norrell et al.

(10) Patent No.: US 7,483,528 B2
(45) Date of Patent: Jan. 27, 2009

(54) LOOP EXTENDER WITH SELECTABLE LINE TERMINATION AND EQUALIZATION

(75) Inventors: Andrew L. Norrell, Nevada City, CA (US); James T. Schley-May, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 1448 days.

(21) Appl. No.: 10/072,833

(22) Filed: Feb. 6, 2002

(65) Prior Publication Data

US 2002/0106013 A1    Aug. 8, 2002

Related U.S. Application Data

(60) Provisional application No. 60/266,953, filed on Feb. 6, 2001.

(51) Int. Cl.
    H04M 1/00    (2006.01)
    H04M 3/00    (2006.01)
    H04M 7/00    (2006.01)
(52) U.S. Cl. .................................... 379/340; 379/347
(58) Field of Classification Search ............ 379/340, 379/346, 347
    See application file for complete search history.

(56) References Cited

U.S. PATENT DOCUMENTS

| | | |
|---|---|---|
| 761,995 A | 6/1904 | Pupin |
| 1,711,653 A | 5/1929 | Quarles |
| 3,180,938 A | 4/1965 | Glomb |
| 3,476,883 A | 11/1969 | Birck et al. |
| 3,548,120 A | 12/1970 | Tarassoff |
| 3,578,914 A | 5/1971 | Simonelli |
| 3,848,098 A | 11/1974 | Pinel |
| 3,873,936 A | 3/1975 | Cho |

(Continued)

FOREIGN PATENT DOCUMENTS

JP    61159833    7/1986

(Continued)

OTHER PUBLICATIONS

"Reference Data for Radio Engineers", Published by the Federal Telephone and Radio Corporation as associate of International Telephone and Telegraph Corporation, Copyright 1943, pp. 3.

(Continued)

*Primary Examiner*—Alexander Jamal
(74) *Attorney, Agent, or Firm*—Blakely, Sokoloff, Taylor & Zafman LLP

(57) ABSTRACT

In accordance with the present invention, a loop extender for improving the transmission of digital subscriber line (DSL) signals over a local loop is disclosed. The loop extender includes selectable line termination and equalization (SLTE) DSL amplification circuitry capacitively coupled to the local loop via bypass relay switches, a plain old telephone service (POTS) loading coil adapted to be coupled to the local loop for improving transmission of POTS band signals over the local loop, and a diagnostic/control unit (DCU) coupled to the local loop for receiving and processing control signals from a central office, coupled to the bypass relay switches via a bypass relay for controlling the bypass relay switches, and coupled to the SLTE DSL amplification circuitry via a plurality of switch control lines for controlling the SLTE DSL amplification circuitry.

23 Claims, 6 Drawing Sheets

U.S. PATENT DOCUMENTS

| | | | |
|---|---|---|---|
| 3,944,723 A | 3/1976 | Fong | |
| 3,962,549 A | 6/1976 | Zuk | |
| 4,025,737 A | 5/1977 | Brewer | |
| 4,131,859 A | 12/1978 | Valle | |
| 4,139,745 A | 2/1979 | Ashdown et al. | |
| 4,242,542 A | 12/1980 | Kimbrough | |
| 4,259,642 A | 3/1981 | Derby | |
| 4,277,655 A | 7/1981 | Surprenant | |
| 4,282,407 A | 8/1981 | Stiefel et al. | |
| 4,334,303 A | 6/1982 | Bertin et al. | |
| 4,392,225 A | 7/1983 | Wortman | |
| 4,462,105 A | 7/1984 | Wagner et al. | |
| 4,583,220 A | 4/1986 | Blackburn et al. | |
| 4,633,459 A | 12/1986 | Blackburn | |
| 4,656,628 A | 4/1987 | Tan | |
| 4,667,319 A | 5/1987 | Chum | |
| 4,766,606 A | 8/1988 | Bardutz et al. | |
| 4,768,188 A | 8/1988 | Barnhart et al. | |
| 4,788,657 A | 11/1988 | Douglas et al. | |
| 4,970,722 A | 11/1990 | Preschutti | |
| 5,049,832 A | 9/1991 | Cavers | |
| 5,095,528 A | 3/1992 | Leslie et al. | |
| 5,133,081 A | 7/1992 | Mayo | |
| 5,181,198 A | 1/1993 | Lechleider | |
| 5,394,401 A | 2/1995 | Patrick et al. | |
| 5,422,929 A | 6/1995 | Hurst et al. | |
| 5,455,538 A | 10/1995 | Kobayashi et al. | |
| 5,526,343 A | 6/1996 | Aizawa et al. | |
| 5,555,274 A | 9/1996 | Sheets et al. | |
| 5,623,485 A | 4/1997 | Bi | |
| 5,678,198 A | 10/1997 | Lemson | |
| 5,724,344 A | 3/1998 | Beck | |
| 5,726,980 A | 3/1998 | Rickard | |
| 5,736,949 A | 4/1998 | Ong et al. | |
| 5,765,097 A | 6/1998 | Dail | |
| 5,790,174 A | 8/1998 | Richard, III et al. | |
| 5,822,325 A | 10/1998 | Segaram et al. | |
| 5,825,819 A | 10/1998 | Cogburn | |
| 5,859,895 A | 1/1999 | Pomp et al. | |
| 5,892,756 A | 4/1999 | Murphy | |
| 5,909,445 A | 6/1999 | Schneider | |
| 5,912,895 A | 6/1999 | Terry et al. | |
| 5,929,402 A | 7/1999 | Charles et al. | |
| 5,974,137 A | 10/1999 | Sheets et al. | |
| 5,991,311 A | 11/1999 | Long et al. | |
| 6,005,873 A | 12/1999 | Amit | |
| 6,029,048 A | 2/2000 | Treatch | |
| 6,032,019 A | 2/2000 | Chen et al. | |
| 6,047,222 A | 4/2000 | Burns et al. | |
| 6,058,162 A | 5/2000 | Nelson et al. | |
| 6,084,931 A | 7/2000 | Powell, II et al. | |
| 6,091,713 A | 7/2000 | Lechleider et al. | |
| 6,091,722 A | 7/2000 | Russell et al. | |
| 6,128,300 A | 10/2000 | Horton | |
| 6,154,524 A | 11/2000 | Bremer | |
| 6,188,669 B1 | 2/2001 | Bellenger | |
| 6,195,414 B1 | 2/2001 | Simmons et al. | |
| 6,208,670 B1 | 3/2001 | Milliron et al. | |
| 6,208,732 B1* | 3/2001 | Moschytz et al. | 379/402 |
| 6,226,322 B1* | 5/2001 | Mukherjee | 375/229 |
| 6,226,331 B1 | 5/2001 | Gambuzza | |
| 6,236,664 B1 | 5/2001 | Erreygers | |
| 6,236,714 B1 | 5/2001 | Zheng et al. | |
| 6,246,695 B1 | 6/2001 | Seazholtz et al. | |
| 6,262,972 B1 | 7/2001 | McGinn et al. | |
| 6,263,047 B1 | 7/2001 | Randle et al. | |
| 6,266,348 B1 | 7/2001 | Gross et al. | |
| 6,266,395 B1 | 7/2001 | Liu et al. | |
| 6,278,769 B1 | 8/2001 | Bella | |
| 6,281,454 B1 | 8/2001 | Charles et al. | |
| 6,301,337 B1 | 10/2001 | Scholtz et al. | |
| 6,343,114 B1 | 1/2002 | Chea, Jr. | |
| 6,345,071 B1 | 2/2002 | Hamdi | |
| 6,345,072 B1 | 2/2002 | Liu et al. | |
| 6,351,495 B1 | 2/2002 | Tarraf | |
| 6,370,188 B1 | 4/2002 | Wu et al. | |
| 6,385,234 B1 | 5/2002 | Ashley | |
| 6,385,252 B1 | 5/2002 | Gradl et al. | |
| 6,385,253 B1 | 5/2002 | Swisher | |
| 6,466,656 B1 | 10/2002 | Evans et al. | |
| 6,477,178 B1 | 11/2002 | Wakim et al. | |
| 6,507,606 B2* | 1/2003 | Shenoi et al. | 375/211 |
| 6,532,279 B1 | 3/2003 | Goodman | |
| 6,546,100 B1 | 4/2003 | Drew | |
| 6,658,049 B1 | 12/2003 | House et al. | |
| 6,681,012 B1 | 1/2004 | Gorcea et al. | |
| 6,751,315 B1 | 6/2004 | Liu et al. | |
| 6,829,292 B1* | 12/2004 | Shenoi | 375/211 |
| 6,947,529 B2 | 9/2005 | Norrell et al. | |
| 6,977,958 B1* | 12/2005 | Hinman et al. | 375/211 |
| 7,072,385 B1 | 7/2006 | Hinman et al. | |
| 7,106,854 B2* | 9/2006 | Gough et al. | 379/398 |
| 2002/0001340 A1 | 1/2002 | Shenoi et al. | |
| 2002/0061058 A1* | 5/2002 | Sommer | 375/213 |
| 2002/0090026 A1* | 7/2002 | Ashley | 375/219 |
| 2002/0105964 A1 | 8/2002 | Sommer et al. | |
| 2002/0106012 A1 | 8/2002 | Norrell et al. | |
| 2002/0106013 A1 | 8/2002 | Norrell et al. | |
| 2002/0106076 A1 | 8/2002 | Norrell et al. | |
| 2002/0110221 A1 | 8/2002 | Norrell et al. | |
| 2002/0113649 A1* | 8/2002 | Tambe et al. | 330/250 |
| 2003/0051060 A1* | 3/2003 | Vitenberg | 709/250 |

FOREIGN PATENT DOCUMENTS

| | | |
|---|---|---|
| WO | WO 98/59426 | 12/1998 |

OTHER PUBLICATIONS

Todd Baker, "The Challenges of Implementing", Tektronix, Oct. 1998 CTE Report, http://www.tektronix.org/Measurement/commtest/cte_reports/27/xdsl.html?view=print&page=http://ww, pp. 5.

Vince Vittore, "Telephony Making DSL go for the long run", http://industryclick.com/magazinearticle.asp?magazinearticleid=7521&magazineid=7&mode=print, Dec. 11, 2000, pp. 2.

U.S. Appl. No. 09/569,470, Brian L. Hinman, DSL Repeater, filed May 12, 2000.

U.S. Appl. No. 09/610,788, Brian L. Hinman, DSP-Based Repeater for DSL Signals, filed Jul. 6, 2000.

U.S. Appl. No. 09/670,475, Brian L. Hinman, Load Coil and DSL Repeater Including Same, filed Sep. 26, 2000.

U.S. Appl. No. 10/071,091, Andrew L. Norrell, Loop Extender with Communications, Control, and Diagnostics, filed Feb. 6, 2002.

U.S. Appl. No. 10/071,980, Andrew L. Norrell, Line Powered Loop Extender with Communications, Control, and Diagnostics, filed Feb. 6, 2002.

Nilsson, J.W., and Riedel, S.A., "Electric Circuits", 1996, pp. 723-777, Fifth Edition, Addison-Wesley, Reading, MA.

Starr, Thomas, et al., "Understanding Digital Subscriber Line Technology," Prentice Hall PTR, Upper Saddle River, NJ, 07458, 1999, ISBN 0137805454, pp. 1-52.

Chen, Walter Y., "DSL Simulation Techniques and Standards Development for Digital Subscriber Line Systems", Macmillan Technical Publishing, Indianapolis, Indiana, ISBN 1578700175, pp. 1-33.

"Smart Coil™—The Line conditioner for the digital age! Smart Coils condition copper pairs for deployment of both ADSL (data) and toll-quality voice services on the same line", Charels a registered Trademark of Charles Industries, LTD., 2 pages.

"Testing Inter-Winding Capacitance", Rhombus Industries, Inc., Huntington Beach, California 1997, 1 page.

"Transformer General Parameters for Telecom Magnetic Component", Delta Products Corporation, Fremont, California, 1 page.

"Design Idea DI-61 TinySwitch®-II 3 W Charger: <200 mW No-Load Consumption", Power® Integrations, www.powerint.com, Mar. 2004, 2 pages.

Lundahl Transformers, Tube amplifier transformers, OPTs, mains, and interstage transformers, http://www.lundahl.se/tubes.html, Apr. 13, 2004, pp. 1-7.

"TechEncyclopedia", TechWeb, http://www.techweb.com/encyclopedia/defineterm?term=dsl&x=20&y=5, Apr. 16, 2004, pp. 1-4.

Grossner, Nathan R., "The Wide-Band Transformer: Synthesis", and "The Pulse Transformer: Analysis", Transformers for Electronic Circuits, Copyright © 1967, by McGraw-Hill, pp. 225-252.

Tietze and Schenk, "Halbleiter Schaltungstechnik", Springer-Verlag, Heidelberg, 1991, pp. 414-447.

"Copper Truck HDSL Repeater", 1999, XP002181004 Retrieved from the Internet: URL: http://web.archive.org/web/20001217100200/http://www.orckit.com/hdsl_repeater.ht ml> Retrieved on Oct. 23, 2001 and Jul. 4, 2005.

Patent Abstracts of Japan, vol. 010, No. 363 (E-461), Publication No. 61159833, Publication Date Jul. 19, 1986, Application No. 59264179, Application Date Dec. 14, 1984.

US 6,351,496, 02/2002, Tarraf (withdrawn)

* cited by examiner

LOOP EXTENDER WITH SELECTABLE LINE TERMINATION AND EQUALIZATION

CROSS REFERENCE TO RELATED APPLICATIONS

This application is related to, and claims the benefit of, U.S. Provisional Patent Application No. 60/266,953, filed on Feb. 6, 2001 and entitled "xDSL Repeater with Selectable Line Termination and Equalization." This application also relates to commonly assigned U.S. patent application Ser. No. 09/569,470, filed on May 12, 2000, now abandoned, and entitled "DSL Repeater," U.S. patent application Ser. No. 09/610,788, filed on Jul. 6, 2000 and entitled "DSP-Based Repeater for DSL Signals," U.S. patent application Ser. No. 09/670,475, filed on Sep. 26, 2000 and entitled "Load Coil And DSL Repeater Including Same," U.S. patent application Ser. No. 10/072,091, filed on Feb. 6, 2002, and entitled "Loop Extender with Communications, Control, and Diagnostics," and U.S. patent application Ser. No. 10/071,980, filed on Feb. 6, 2002 and entitled "Line Powered Loop Extender with Communications, Control, and Diagnostics." The disclosures of these related applications are hereby incorporated by reference.

BACKGROUND OF THE INVENTION

1. Field of the Invention

The present system and method relate generally to Digital Subscriber Line (DSL) technology, and more particularly to a system and method for improving ADSL (Asymmetric DSL) and VDSL (Very high data rate DSL) system performance over long local loops.

2. Description of the Background Art

One method of accessing the Internet is by using DSL technology, which has several varieties, including ADSL and VDSL versions. ADSL is one version of DSL technology that expands the useable bandwidth of existing copper telephone lines. ADSL is "asymmetric" in that ADSL reserves more bandwidth in one direction than in the other, which may be beneficial for users who do not require equal bandwidth in both directions. In one implementation, ADSL signals generally occupy the frequency band between about 25 kHz and 1.104 MHz. In this configuration, ADSL uses the frequency band between about 25 kHz and 120 kHz to transmit upstream signals (signals from a customer premises to a central office) and the frequency band between about 150 kHz to 1.104 MHz to transmit downstream signals (signals from the central office to a customer premises).

ADSL employs Frequency Division Multiplexing (FDM) to separate upstream and downstream signals and to separate ADSL signals from POTS (Plain Old Telephone Service) band signals, which reside below 4 kHz. VDSL also uses FDM to separate downstream and upstream channels as well as to separate both downstream and upstream channels from POTS signals.

In the past, ADSL has been used to deliver high-speed data services to subscribers up to about 18,000 feet from their serving central office or central office extension. The potential data rates range from above about 8 MBPS for short loops, but drop off dramatically on long loops, such as local loops over about 18,000 feet, to about 0.5 MBPS or less. Conventionally, ADSL service generally employs a local loop length of about 6,000-14,000 feet for optimal service. Loop length is generally defined as the length of the wire between the central office, or central office extension, and the customer premises, such as a home or business. "Central office" and "central office extension" are collectively referred to herein as "central office."

DSL signals generally degrade as they traverse the local loop. Hence, the longer the local loop length, the more degraded the DSL signal will tend to be upon arriving at a central office or a customer premises. While some DSL service is conventionally possible with loop lengths longer than 14,000 feet, it has been found that with loops much longer than about 14,000 feet, the DSL signal is too degraded to provide high data transfer rates.

DSL signal degradation over a local loop may be caused, for example, by factors such as: signal attenuation, crosstalk, thermal noise, impulse noise, and ingress noise from commercial radio transmitters. The dominant impairment, however, is often signal attenuation. For example, a transmitted ADSL signal can suffer as much as 60 dB or more of attenuation on long loops, which substantially reduces the useable signal, greatly reducing potential data rates.

Additional details regarding DSL signal degradation over long loops and regarding DSL technology more generally are described in *Understanding Digital Subscriber Line Technology* by Starr, Cioffi, and Silverman, Prentice Hall 1999, ISBN 0137805454 and in *DSL—Simulation Techniques and Standards Development for Digital Subscriber Line Systems* by Walter Y. Chen, Macmillan Technical Publishing, ISBN 1578700175, the disclosures of which are hereby incorporated by reference.

SUMMARY OF THE INVENTION

In accordance with the present invention, a loop extender for improving the transmission of DSL signals over a local loop is disclosed. The loop extender includes selectable line termination and equalization (SLTE) DSL amplification circuitry capacitively coupled to the local loop via bypass relay switches, a POTS loading coil adapted to be coupled to the local loop for improving transmission of POTS band signals over the local loop, and a diagnostic/control unit (DCU) coupled to the local loop for receiving and processing control signals from a central office, coupled to the bypass relay switches via a bypass relay for controlling the bypass relay switches, and coupled to the SLTE DSL amplification circuitry via a plurality of switch control lines for controlling the SLTE DSL amplification circuitry.

In one embodiment of the invention, the SLTE DSL amplification circuitry includes a plurality of upstream complex impedances coupled in parallel and selectable via a first switch, a plurality of downstream complex impedances coupled in parallel and selectable via a second switch, a plurality of upstream filter/amplifying elements coupled in parallel and selectable via a third switch, and a plurality of downstream filter/amplifying elements coupled in parallel and selectable via a fourth switch. The first switch is controlled via a first switch control line, the second switch is controlled via a second switch control line, the third switch is controlled via a third switch control line, and the fourth switch is controlled via a fourth switch control line.

In one embodiment of the invention, the DCU includes a modem coupled to the local loop for communication with the central office, an analog multiplexer/analog-to-digital converter (AMADC) for controlling the first, second, third, and fourth switches via the switch control lines, and a diagnostic/control processor (DCP) coupled to the modem and the AMADC for processing control signals received via the modem and sending the control signals to the AMADC.

The DCU, in response to the control signals received from the central office, instructs the first switch to select one of the plurality of complex upstream impedances. In a preferred embodiment of the invention, the DCU instructs the first switch to select a complex upstream impedance that approximately matches the local loop impedance in a first direction along the local loop, where the first direction is directed from the SLTE DSL amplification circuitry to the central office along the local loop. In addition, in response to the control signals received from the central office, the DCU instructs the second switch to select one of the plurality of complex downstream impedances, the third switch to select one of the plurality of upstream filter/amplifying elements, and the fourth switch to select one of the plurality of downstream filter/amplifying elements.

In one embodiment of the invention, the loop extender includes a bypass relay for coupling the bypass relay switches to the DCU. The DCU, in accordance with the control signals received from the central office, may uncouple the SLTE DSL amplification circuitry from the local loop by activating a deactivated bypass relay, or the DCU may couple the SLTE DSL amplification circuitry to the local loop by deactivating an activated bypass relay.

In one embodiment of the invention, the DCU may sample DSL signals within the SLTE DSL amplification circuitry, process the sampled DSL signals, and select SLTE DSL amplification circuitry switch states in accordance with the processed sampled DSL signals to improve SLTE DSL amplification circuitry performance.

DETAILED DESCRIPTION OF THE DRAWINGS

Figure 1:
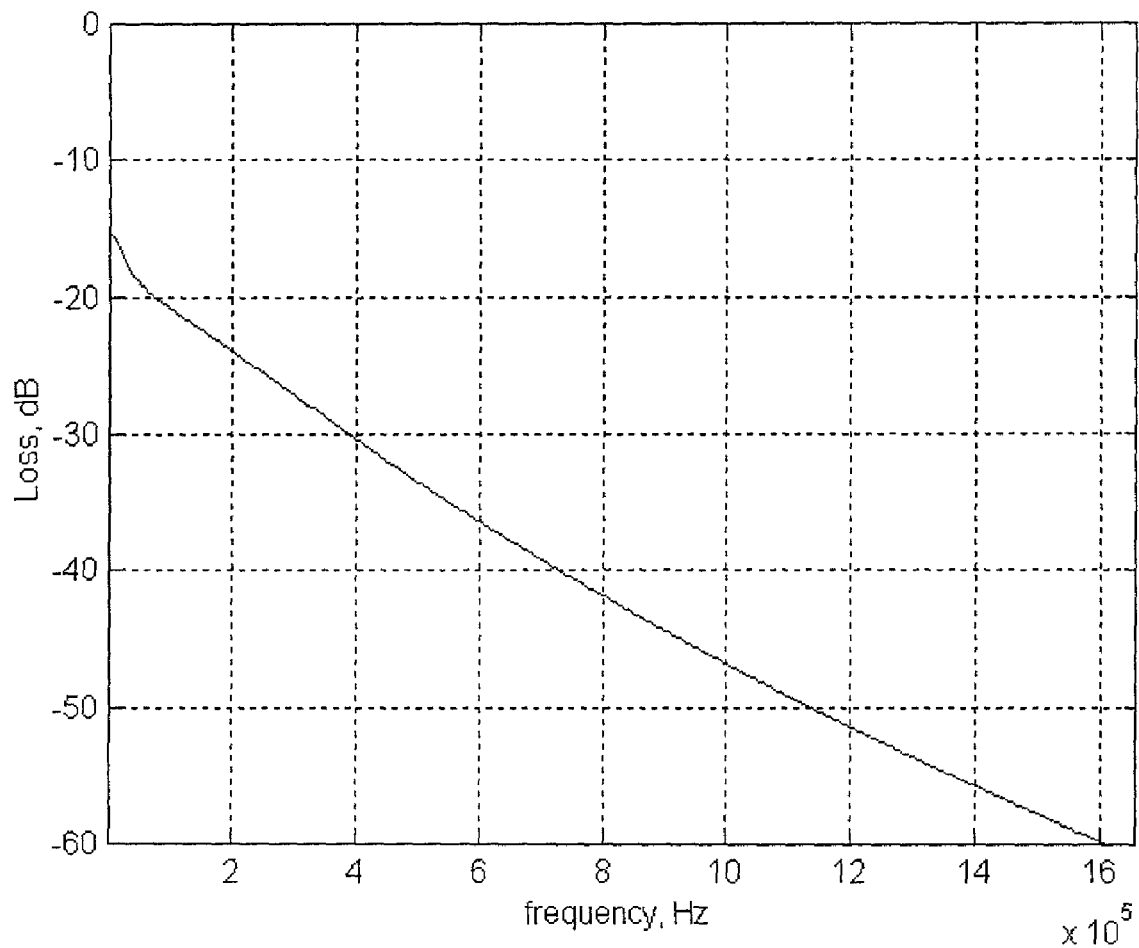
FIG. 1 is a graph illustrating one example of DSL signal attenuation over a 6,000-foot length of telephone cable as a function of signal frequency.

FIG. 1 illustrates an example of the attenuation of a DSL signal over 6,000 feet of 26 AWG (American Wire Gauge) telephone cable. As shown, higher frequency signals are generally attenuated more than lower frequency signals. In the FIG. 1 example, a 250 kHz signal is attenuated by about 25 dB over 6,000 feet of 26 AWG telephone cable while a 1 MHz signal is attenuated by about 46 dB over 6,000 feet of 26 AWG telephone cable. As those skilled in the art will appreciate, the actual degree of attenuation will also depend on factors in addition to loop length, such as temperature.

Figure 2:
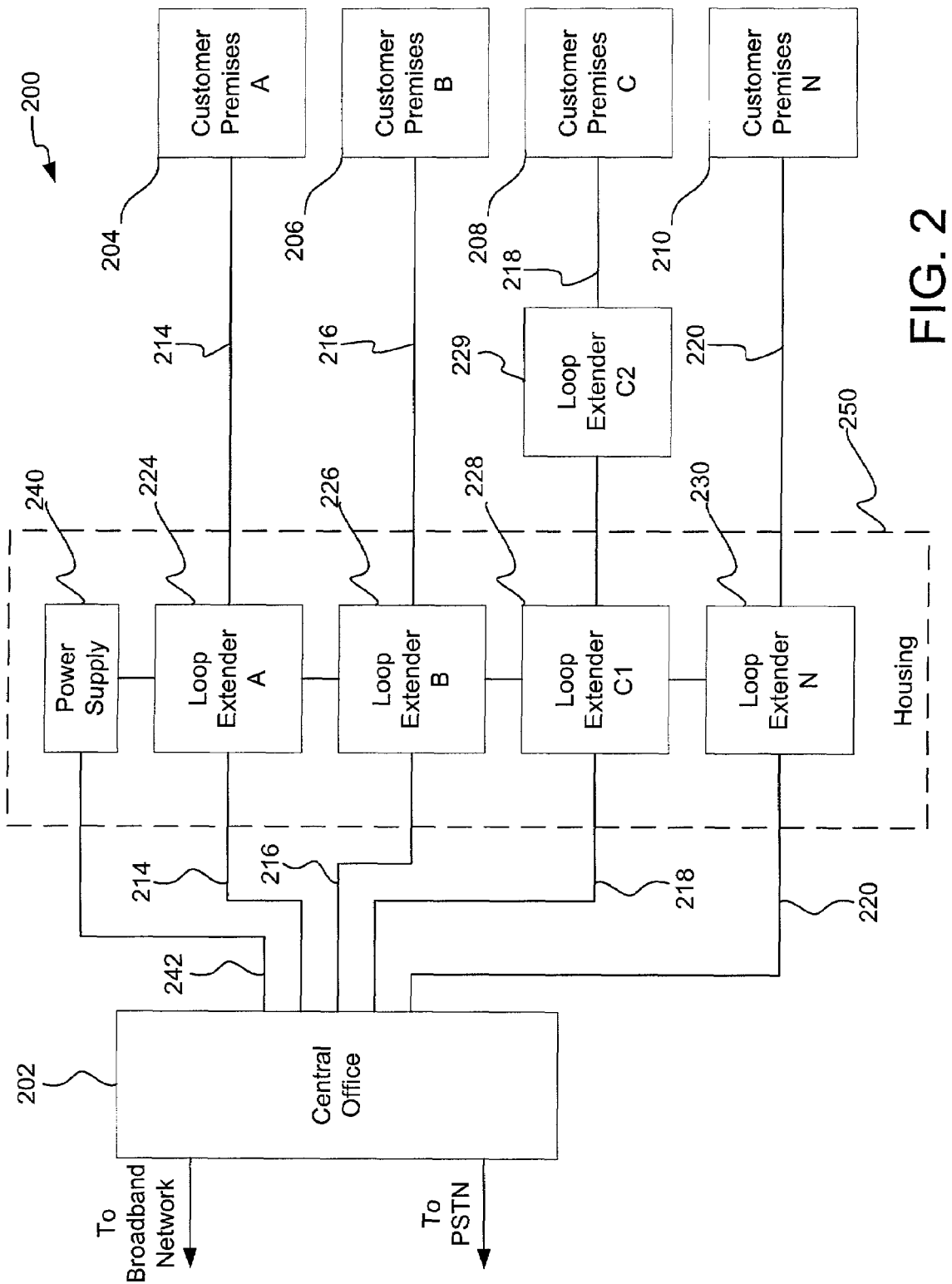
FIG. 2 illustrates multiple local loops interconnecting a central office and multiple customer premises with each local loop having at least one loop extender coupled thereto.

FIG. 2 illustrates a DSL network 200 that includes a central office 202, a customer premises A 204, a customer premises B 206, a customer premises C 208, and a customer premises N 210. Customer premises 204, 206, 208, and 210 are respectively coupled to central office 202 by local loops 214, 216, 218, and 220. Each local loop comprises a twisted pair of copper wires; commonly know in the art as a "twisted pair." Typically, the copper wires are formed of 22, 24, or 26 AWG wire.

Moreover, as those skilled in the art will appreciate, central office 202 and each of customer premises 204, 206, 208, and 210 includes a DSL termination device, such as a DSL modem, for transmitting and receiving DSL signals over an associated local loop.

A loop extender 224, also called a DSL repeater, is coupled to local loop 214 to amplify DSL signals, such as ADSL or VDSL signals, passing over local loop 214 between central office 202 and customer premises 204. As discussed above, DSL signals are generally attenuated as they travel along a local loop, such as local loop 214. Loop extender 224 is disposed along local loop 214 between central office 202 and customer premises 204 to at least partially compensate for the DSL signal attenuation by amplifying the transmitted DSL signals. Additional details of loop extender 224 are described below with reference to FIGS. 3-6.

In addition, a loop extender 226 is coupled to local loop 216 between central office 202 and customer premises 206 to amplify DSL signals passing between central office 202 and customer premises 206. Likewise, a loop extender 230 is disposed between central office 202 and customer premises 210 to amplify DSL signals passing therebetween. Loop extenders 226 and 230 are configured the same as loop extender 224.

Further, FIG. 2 illustrates that multiple loop extenders may be coupled in series, or in cascaded fashion, to a single loop for amplifying transmitted DSL signals multiple times and in multiple locations between a customer premises and central office 202 to permit DSL signals to be transmitted over greater distances while still maintaining an acceptable DSL signal amplitude. Specifically, loop extender 228 and loop extender 229 are coupled in series to local loop 218, which couples central office 202 and customer premises 208. Pursuant to this configuration, loop extender 228 first amplifies a downstream DSL signal transmitted from central office 202 over local loop 218 to customer premises 208 and loop extender 229 then amplifies the downstream signal again.

Hence, loop extender 228 amplifies the downstream signal to at least partially compensate for the attenuation incurred as the downstream signal passes over the portion of local loop 218 between central office 202 and loop extender 228. Next, loop extender 229 amplifies the downstream signal to at least partially compensate for the attenuation incurred as the downstream signal passes from loop extender 228 to loop extender 229.

Likewise, for upstream DSL signals from customer premises 208 to central office 202, loop extender 229 amplifies the upstream signals to at least partially compensate for the attenuation that occurs between customer premises 208 and loop extender 229. Next, loop extender 228 amplifies the upstream signal to at least partially compensate for the attenuation incurred as the upstream signal passes from loop extender 229 over local loop 218 to loop extender 228.

According to one embodiment, loop distance between loop extenders 228 and 229 is between about 5,000 and 7,000 feet. In a preferred embodiment, the loop distance between loop extenders 228 and 229 is about 6,000 feet. As discussed in more detail below, this loop distance between multiple loop extenders disposed in series, in cascaded fashion, along a single local loop may be advantageous in that each loop extender may be adapted with POTS loading coils. These embodiments may then replace conventional POTS loading coils, which are disposed about every 6,000 feet along a local loop to provide both POTS loading and DSL signal amplification functionality. Additional details of adapting POTS loading coils to loop extenders are discussed below with reference to FIGS. 3-6.

Local loop 218 is illustrated as having two cascaded loop extenders 228 and 229 coupled thereto between central office 202 and customer premises 208. It should be noted, however, that additional loop extenders (not shown) may be disposed in series between central office 202 and customer premises 208 so that DSL signals may be effectively transmitted over an even longer local loop 218 by being amplified multiple times by multiple loop extenders.

In the embodiment illustrated in FIG. 2, loop extenders 224, 226, 228, and 230 receive electrical power from a power supply 240, which preferably receives power over a twisted pair 242 from central office 202. Twisted pair 242 is a dedicated twisted pair that delivers DC current to power supply 240 in the same manner in which electrical power is conventionally provided to T1 line repeaters. While not separately illustrated, loop extender 229 may receive power from a separate dedicated twisted pair or may receive power from power supply 240. Lastly, power supply 240; loop extenders 224, 226, 228, and 230; and the associated circuitry may be disposed in a common housing 250.

Figure 3:
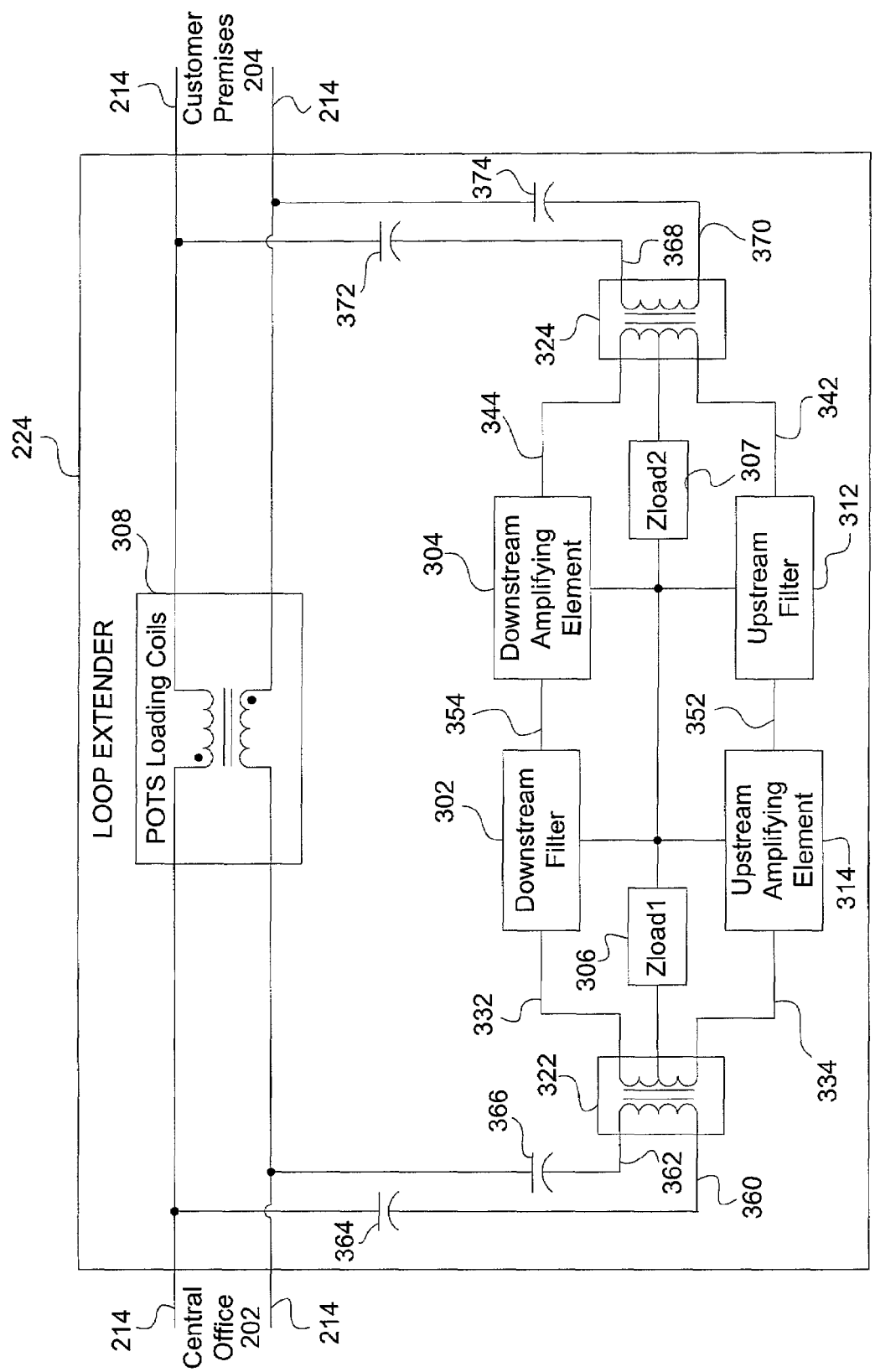
FIG. 3 illustrates one embodiment of a FIG. 2 loop extender.

FIG. 3 illustrates details of one embodiment of loop extender 224 of FIG. 2. As shown, loop extender 224 is coupled to local loop 214 between central office 202 and customer premises 204. Loop extender 224 is depicted as including a downstream filter 302, a downstream amplifying element or stage 304, an upstream filter 312, an upstream amplifying element or stage 314, a complex impedance Zload1 306, a complex impedance Zload2 307, a transformer 322 with a split secondary winding, a transformer 324 with a split secondary winding, and POTS loading coils 308. Transformers with a split secondary winding are also known as center-tapped transformers.

Filters 302 and 312, amplifying elements 304 and 314, and complex impedances 306 and 307 are disposed between transformers 322 and 324. Amplifying elements 304 and 314 may comprise amplifiers or amplifying equalizers. More details regarding the functionality and operational characteristics of filters 302 and 312, amplifying elements 304 and 314, complex impedances 306 and 307, and transformers 322 and 324 are disclosed in U.S. patent application Ser. No. 09/569,470, filed on May 12, 2000 and entitled "DSL Repeater."

Transformer 322 is capacitively coupled to local loop 214 on the central office side of POTS loading coils 308 along lines 360 and 362. A capacitor 364 (100 nF) is disposed along line 360 and a capacitor 366 (100 nF) is disposed along line 362 to capacitively couple transformer 322 to local loop 214 on the central office side of POTS loading coils 308.

Similarly, transformer 324 is capacitively coupled to local loop 214 on the customer premises side of POTS loading coils 308 along lines 368 and 370. A capacitor 372 (100 nF) is disposed along line 368 and a capacitor 374 (100 nF) is disposed along line 370 to capacitively couple transformer 324 to local loop 214 on the customer premises side of POTS loading coils 308.

In general, transformer 322 receives downstream DSL signals from central office 202 along local loop 214 and outputs the downstream DSL signals to downstream filter 302 along a line 332. Transformer 322 also receives amplified upstream DSL signals from upstream amplifying element 314 along a line 334 and outputs the upstream DSL signals onto local loop 214 for transmission to central office 202.

Similarly, transformer 324 receives upstream DSL signals from customer premises 204 along local loop 214 and outputs the upstream DSL signals to upstream filter 312 along a line 342. Transformer 324 also receives amplified downstream DSL signals from downstream amplifying element 304 along a line 344 and outputs the downstream DSL signals onto local loop 214 for transmission to customer premises 204.

As those skilled in the art will appreciate, where transformer 322 is imperfect, at least a portion of the upstream amplified DSL signal received via line 334 will leak through transformer 322 onto line 332. Likewise, where transformer 324 is imperfect, at least a portion of the downstream amplified DSL signal received via line 344 will leak through transformer 324 onto line 342. Without the presence of filters 302 and 312, this DSL signal leakage could cause a phenomenon known in the art as "singing"—that is oscillations caused by introducing gain into a bi-directional system due to signal leakage.

The signal leakage problem is overcome, or substantially alleviated, through the use of downstream filter 302 and upstream filter 312. In one version of Category 1 ADSL, ADSL upstream signals generally occupy the frequency spectrum between about 25-120 kHz and ADSL downstream signals generally occupy the frequency spectrum between about 150 kHz-1.104 MHz. Downstream filter 302 substantially prevents leaked upstream signals from being transmitted back to customer premises 204 by significantly attenuating signals between 25 kHz and 120 kHz for ADSL. Likewise, upstream filter 312 is configured to provide significant attenuation to signals between about 150 kHz-1.104 MHz for ADSL. For other varieties of DSL, such as VDSL, filters 302 and 312 respectively attenuate signals outside the downstream and upstream frequency bands, although the limits of these bands may be different than those for the ADSL variety.

In operation, loop extender 224 receives upstream DSL signals from customer premises 204 via transformer 324, filters out, or substantially attenuates, signals in the downstream frequency band with upstream filter 312 and then passes the filtered upstream signal to upstream amplifying element 314 via a line 352 for amplification. Loop extender 224 then passes the amplified upstream DSL signal onto local loop 214 for transmission to central office 202. Similarly, loop extender 224 receives downstream DSL signals from central office 202 via transformer 322, filters out, or substantially attenuates, signals in the upstream frequency band with downstream filter 302 and then passes the filtered downstream signal to downstream amplifying element 304 via a line 354 for amplification. Loop extender 224 then passes the amplified downstream DSL signal onto local loop 214 for transmission to customer premises 204.

As shown, loop extender 224 includes POTS loading coils 308 coupled to local loop 214 to improve transmission of voice, or POTS, frequency signals over long local loop lengths, such as those longer than about 18,000 feet. In one embodiment, POTS loading coils 308 comprise loading coils having an inductance of about 88 mH.

Loop extender 224 of FIG. 3 may be advantageously employed in circumstances where local loop 214 already has conventional POTS loading coils coupled thereto. In this circumstance, loop extender 224 of FIG. 3 may simply replace the conventional POTS loading coils to provide both POTS loading coils and DSL signal amplification functionality. Indeed, POTS loading coils are conventionally disposed about every 6,000 feet along some long local loops to improve voice frequency transmission over long local loops. By replacing these conventional POTS loading coils with loop extender 224 of FIG. 3, a single device, namely loop extender 224 of FIG. 3, may provide both voice frequency transmission improvement and DSL signal amplification. Moreover, replacing existing POTS loading coils with loop extender 224 of FIG. 3 permits loop extender 224 to potentially use any housing or other hardware (not shown) associated with the previously existing POTS loading coils, thereby potentially facilitating installation of loop extender 224 of FIG. 3 along local loop 214.

Figure 4:
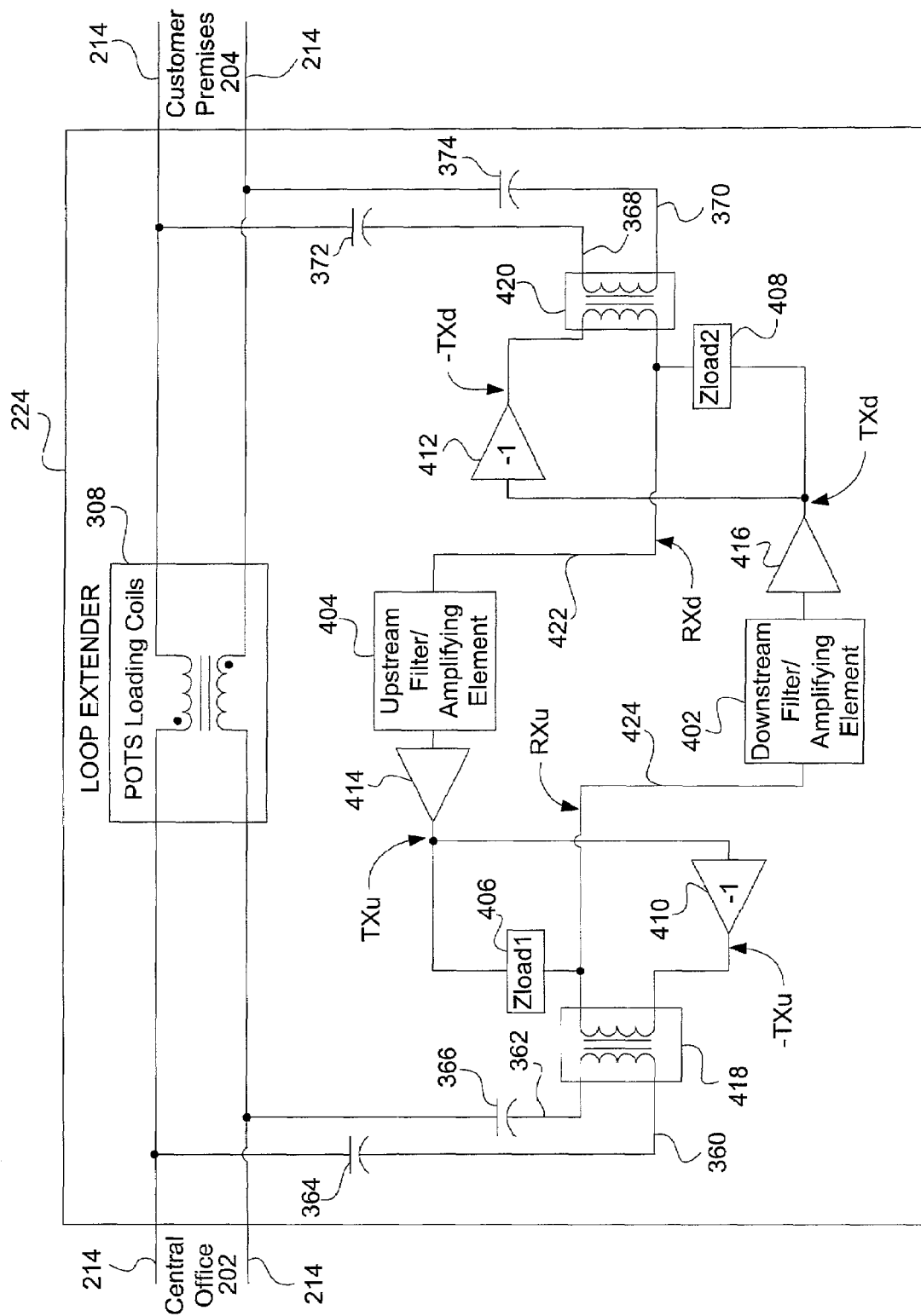
FIG. 4 illustrates another embodiment of a FIG. 2 loop extender.

FIG. 4 illustrates details of another embodiment of loop extender 224 of FIG. 2. Loop extender 224 is depicted as including a downstream filter/amplifying element 402, an upstream filter/amplifying element 404, a complex impedance Zload1 406, a complex impedance Zload2 408, inverting buffers 410 and 412, non-inverting buffers 414 and 416, non-center-tapped transformers 418 and 420, and POTS loading coils 308. For the purposes of discussion, non-center-tapped transformers are also referred to as single-ended transformers and the FIG. 4 embodiment of loop extender 224 is referred to as a single-ended loop extender. Although FIG. 4 shows filtering and amplification functions combined as discrete filter/amplifying elements (402 and 404), the scope of the present invention includes loop extenders with separate filter and amplifying elements.

The impedance seen looking into transformer 420 from lines 368 and 370 is approximately Zload2 408, since inverting buffer 412 and non-inverting buffer 416 are zero impedance AC ground to upstream DSL signals. Typically, Zload2 408 is approximately matched to the impedance seen looking into lines 368 and 370 from transformer 420 and Zload1 406 is approximately matched to the impedance seen looking into lines 360 and 362 from transformer 418.

In operation, transformer 420 receives an upstream DSL signal from local loop 214 and sends the upstream DSL signal to upstream filter/amplifying element 404 via upstream line 422. Upstream filter/amplifying element 404 then filters and amplifies the upstream DSL signal, and sends the filtered and amplified signal to non-inverting buffer 414. Non-inverting buffer 414 sends the DSL signal to Zload1 406 and inverting buffer 410. Inverting buffer 410 inverts the DSL signal. The output of inverting buffer 410 is 180 degrees out of phase with the output of non-inverting buffer 414. The output of non-inverting and inverting buffers (414 and 410) then drive the serial combination of transformer 418 and Zload1 406. However, since the serial combination of transformer 418 and Zload1 406 is driven with a differential signal that is symmetric about ground, and since Zload1 406 is approximately matched to the impedance seen looking into lines 360 and 362 from transformer 418, a residual upstream voltage RXu approximately equal to zero is developed on downstream line 424. That is, loop extender 224 of FIG. 4 is configured to couple an upstream DSL signal received from the customer premises side of local loop 214 to the central office side of local loop 214 by driving the serial combination of transformer 418 and Zload1 406 with the upstream DSL signal symmetrically centered about ground, where Zload 406 is effectively matched to the line impedance seen looking out from transformer 418. In the process of coupling the upstream DSL signal to the central office side of local loop 214, loop extender 224 generates a residual upstream voltage RXu approximately equal to zero on the downstream line 424. In addition, loop extender 224 of FIG. 4 filters and amplifies the upstream DSL signal.

In a similar manner, transformer 418 receives a downstream DSL signal from the central office side of local loop 214 and sends the downstream DSL signal to downstream filter/amplifying element 402 via downstream line 424. Downstream filter/amplifying element 402 filters and amplifies the DSL signal and sends the filtered and amplified DSL signal to non-inverting buffer 416. Non-inverting buffer 416 sends the DSL signal to inverting buffer 412 and Zload2 408. The symmetric, differential output of inverting and non-inverting buffers (412 and 416) then drives the serial combination of Zload2 408 and transformer 420, coupling the downstream DSL signal to the customer premises side of the local loop 214 and generating a residual downstream voltage RXd on the upstream line 422. If Zload2 408 is approximately matched to the line impedance seen by transformer 420, then residual downstream voltage RXd generated on upstream line 422 is approximately equal to zero.

The amount of residual voltage RXu generated by the coupling of upstream DSL signals to the central office side of local loop 214 via transformer 418 and the amount of residual voltage RXd generated by the coupling of downstream DSL signals to the customer premises side of local loop 214 via transformer 420 depend upon how closely Zload1 406 and Zload2 408 match line impedances (360, 362) and (368, 370), respectively. Loop extender 224 generates small residual voltages (RXu and RXd) when complex impedances (406 and 408) approximately match the line impedances. In other words, close matching between complex impedances (406 and 408) and line impedances provides for stable operation of a high-gain loop extender. If complex impedances (406 and 408) do not closely match the line impedances, positive feedback of residual voltages (RXu and RXd) may lead to unstable loop extender performance.

Line impedance seen from loop extender 224 depends upon line gauge of the local loop (26 or 24 AWG, typically), length of the local loop from the loop extender to the next device (3000 or 6000 feet, typically), and the impedance of the next device. The next device is typically another loop extender or a DSL termination unit (DSL modem) located in either central office 202 or in customer premises 204. If the next device is a DSL termination unit, the termination impedance is typically 100 ohms resistive. However, if the next device is another loop extender, the impedance is a complex impedance defined by the design of the other loop extender.

Both center-tapped (FIG. 3) and single-ended (FIG. 4) loop extender topologies offer unique advantages and disadvantages as well understood by those skilled in the art. For the purposes of illustration and discussion, the following embodiment of selectable line termination and equalization of the present invention is configured within a single-ended loop extender topology, although the scope of the invention applies equally well to selectable line termination and equalization embodiments configured within a center-tapped loop extender topology.

Figure 5:
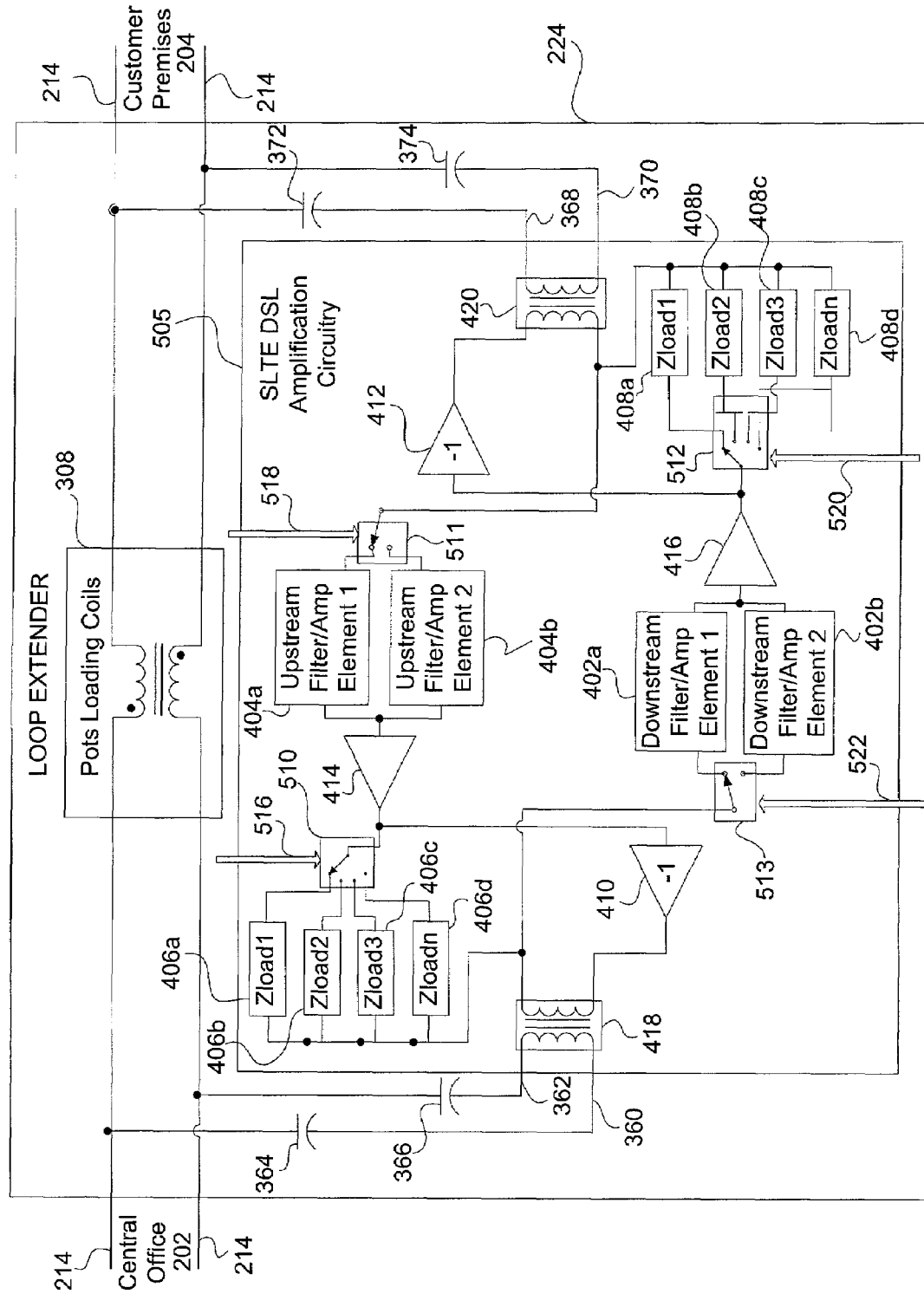
FIG. 5 illustrates another embodiment of a FIG. 4 loop extender with selectable line termination and equalization.

FIG. 5 illustrates another embodiment of loop extender 224 of FIG. 4 with selectable line termination and equalization (SLTE) functionality. The FIG. 5 embodiment of loop extender 224 includes POTS loading coils 308 and SLTE DSL amplification circuitry 505 capacitively coupled to local loop 214 between central office 202 and customer premises 204. SLTE DSL amplification circuitry 505 includes a plurality of upstream complex impedances 406 selectable via switch 510, a plurality of downstream complex impedances 408 selectable via switch 512, a plurality of upstream filter/amplifying elements 404 selectable via switch 511, a plurality of downstream filter/amplifying elements 402 selectable via switch 513, and switch control lines 516, 518, 520, and 522. The FIG. 5 embodiment of loop extender 224 is configured with a plurality of upstream complex impedances (Zload1 406a, Zload2 406b, Zload3 406c, and Zloadn 406d) to approximate various line impedances seen from transformer 418 and with a plurality of downstream complex impedances (Zload1 408a, Zload2 408b, Zload3 408c, Zloadn 408d) to approximate various line impedances seen from transformer 420. For example, switch 510 may select either Zload1 406a, Zload2 406b, Zload3 406c, or Zloadn 406d to approximately match an upstream line impedance seen from transformer 418 and switch 512 may select either Zload1 408a, Zload2 408b, Zload3 408c, or Zloadn 408d to approximately match a downstream line impedance seen from transformer 420. Although FIG. 5 illustrates four upstream complex impedances and four downstream complex impedances, the scope of the invention covers loop extenders with any number of upstream and downstream complex or resistive impedances.

The FIG. 5 embodiment of loop extender 224 is also configured with a plurality of upstream filter/amplifying elements (404a, 404b) and downstream filter/amplifying elements (402a, 402b) to allow a user of loop extender 224 flexibility in DSL signal processing. For example, a first filter/amplifying element applied to a DSL signal to compensate for DSL signal transmission losses along 3000 feet of wire may be significantly different than a second filter/amplifying element applied to a DSL signal to compensate for transmission losses along 6000 feet of wire. The selection of filter/amplifying elements 404 and 402 by switches 511 and 513 depend upon line gauge, line length, and temperature, and is typically independent of line impedance and upstream and downstream complex impedances 406 and 408 selected via switches 510 and 512.

In operation, the selection of line termination (complex impedances) and equalization (filtering/amplification elements) may be accomplished by several different methods and structures. For example, in one embodiment of loop extender 224 of FIG. 5, switches 510-513 are rotary or dip switches that are set by a technician or operator. The technician or operator may set the switches in accordance with local line conditions upon installation of loop extender 224, and may reset the switches as local line conditions change. In another embodiment discussed further below in conjunction with FIG. 6, switches 510-513 are electronic switches controlled by an on-board microprocessor and switch control lines 516, 518, 520, and 522.

Figure 6:
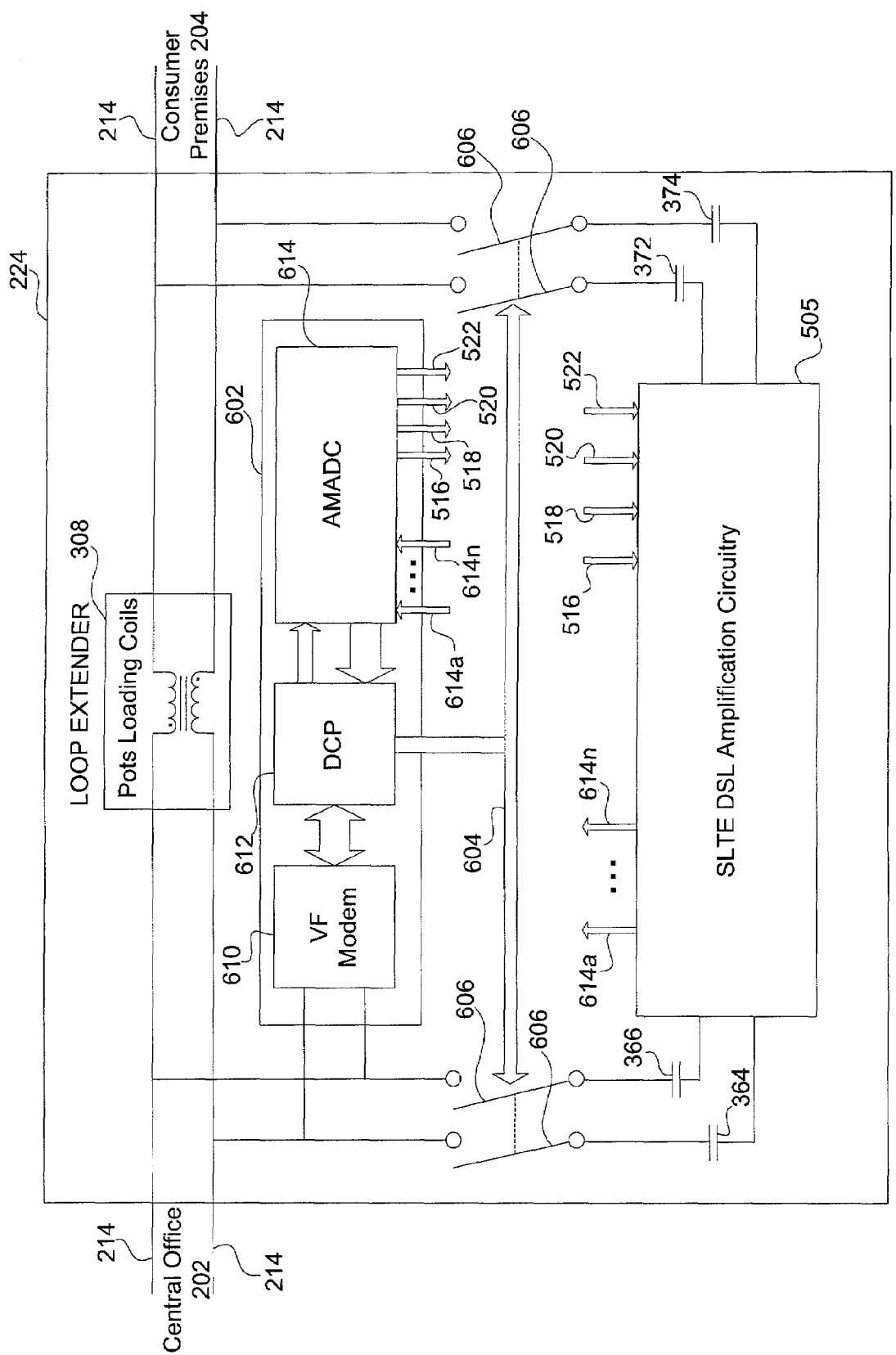
FIG. 6 illustrates another embodiment of a FIG. 5 loop extender with communications, control, and diagnostics functionality.

FIG. 6 illustrates another embodiment of loop extender 224 of FIG. 5 with selectable line termination and equalization controlled by an on-board microprocessor. Loop extender 224 of FIG. 6 includes SLTE DSL amplification circuitry 505 for amplifying the DSL signals and a diagnostic/control unit (DCU) 602 for controlling the SLTE DSL amplification circuitry 505. DCU 602 includes a VF modem 610, a diagnostic/control processor (DCP) 612, and an analog Mux/AD Converter (AMADC) 614 connected in series.

VF modem 610 receives control signals from central office 202 and sends response signals and data to central office 202 via local loop 214. DCP 612 processes the control signals received from central office 202 via VF modem 610, sends the processed control signals to AMACD 614, receives data from AMADC 614, analyzes some or all of the received data, and sends the analyzed and unanalyzed data to central office 202 via VF modem 610. AMADC 614 controls the state of switches 510, 511, 512, and 513 via switch control lines 516, 518, 520, and 522 respectively upon receiving the processed control signals from DCP 612. AMADC 614 may also sample DSL signal data at locations (not shown) in the SLTE DSL amplification circuitry 505 via a plurality of diagnostic lines 614, convert the sampled signal data to analog data, and send the converted signal data to DCP 612 for analysis. The sampling of DSL signal data via diagnostic lines 614 and the communications, control, and diagnostics functionality of loop extender 224 and central office 202 is disclosed in a U.S. patent application Ser. No. 10/072,091 entitled "Loop Extender with Communications, Control and Diagnostics" filed on Feb. 6, 2002, the disclosure of which is hereby incorporated by reference.

In the FIG. 6 embodiment of the present invention, central office 202 issues control signals to DCP 612 via local loop 214. Control signals issued by central office 202 may be based upon performance characteristics of loop extender 224, desired DSL signal amplification of loop extender 224, or local line conditions, for example. DCP 612 receives and processes the control signals and instructs AMADC 614 to select a state for each switch 510-513 via switch control lines 516, 518, 520, and 522. Furthermore, in a normal state of operation, SLTE DSL amplification circuitry 505 is electrically coupled to local loop 214 via switches 606. DCP 612, upon receiving control signals from central office 202, may decouple SLTE DSL amplification circuitry 505 from local loop 214 by activating bypass relay 604. When bypass relay is activated, switches 606 are open and SLTE DSL amplification circuitry 505 is electrically decoupled from local loop 214.

In another embodiment of the present invention, selectable line termination and equalization is an automated procedure, based upon DSL signal data sampled by AMADC 614 at locations within SLTE DSL amplification circuitry 505 via diagnostic lines 614. For example, AMADC 614 samples DSL signal data from SLTE DSL amplification circuitry 505 via diagnostic lines 614, and sends the sampled DSL signal data to DCP 612. DCP 612 analyzes the sampled DSL signal data to determine loop extender performance, and based upon the analyzed DSL signal data, may instruct AMADC 614 to select alternate states of switches 510-513 via switch control lines 516, 518, 520, and 522 to improve loop extender performance. Alternatively, DCP 612 sends the sampled DSL signal data to central office 202 for further processing and evaluation. Central office 202 then issues control signals to DCP 612 via local loop 214 to select alternate states of switches 510-513.

In another embodiment of the present invention, the plurality of complex impedances (406 and 408) may be configured as sub-elements of a single impedance circuit block (not shown). Additionally, the plurality of upstream filter/amplifying elements 404 and downstream filter/amplifying elements 402 may be configured as sub-elements of a single upstream amplification/filtering network circuit block and a single downstream amplification/filtering network circuit block, respectively. Switches 510-513 then select between the various sub-elements of the circuit blocks. By configuring impedances and filters/amplifying elements as sub-elements of circuit blocks, components common to each sub-element can be shared, thus decreasing the total number of components and reducing loop extender cost.

The invention has been explained above with reference to preferred embodiments. Other embodiments will be apparent to those skilled in the art in light of this disclosure. The present invention may readily be implemented using configurations other than those described in the preferred embodiments above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for improving transmission of digital subscriber line (DSL) signals over a local loop, the system comprising:

a loop extender capacitively coupled to the local loop, the loop extender comprising:
  a plurality of upstream complex impedances coupled in parallel;
  a plurality of downstream complex impedances coupled in parallel;
  a first upstream filter and amplifying element coupled to the plurality of upstream complex impedances via a first switch;
  a first downstream filter and amplifying element coupled to the plurality of downstream complex impedances via a second switch;
  at least one additional upstream filter and amplifying element coupled in parallel to the first upstream filter and amplifying element;
  at least one additional downstream filter and amplifying element coupled in parallel to the first downstream filter and amplifying element;
  a first transformer coupled to the plurality of upstream complex impedances, a first inverting buffer, and either the first downstream filter and amplifying element or one of the at least one additional downstream filter and amplifying elements via a third switch to couple the plurality of upstream complex impedances, the first inverting buffer, and either the first downstream filter and amplifying element or one of the at least one additional downstream filter and amplifying elements via the third switch to the local loop; and
  a second transformer coupled to the plurality of downstream complex impedances, a second inverting buffer, and either the first upstream filter and amplifying element or one of the at least one additional upstream filter and amplifying elements via a fourth switch to couple the plurality of downstream complex impedances, the second inverting buffer, and either the first upstream filter and amplifying element or one of the at least one additional upstream filter and amplifying elements via the fourth switch to the local loop.

2. The system of claim 1, wherein the loop extender further comprises:
  a plain old telephone service (POTS) loading coil adapted to be coupled to the local loop for improving transmission of POTS band signals over the local loop; and
  a diagnostic and control unit coupled to the local loop for providing communications, control, and diagnostic functionality.

3. The system of claim 2, wherein the diagnostic and control unit comprises:
  a modem coupled to the local loop for communication with a central office;
  an analog multiplexer and analog-to-digital converter (AMADC) for controlling the first, second, third, and fourth switches via switch control lines; and
  a diagnostic and control processor (DCP) coupled to the modem and the AMADC for processing control signals received via the modem and sending the control signals to the AMADC.

4. The system of claim 3, wherein the first transformer is coupled to the local loop via a first bypass relay switch and the second transformer is coupled to the local loop via a second bypass relay switch.

5. The system of claim 4, further comprising a bypass relay for coupling the first and second bypass relay switches to the DCP.

6. The system of claim 5, wherein the DCP upon receiving control signals from the central office, decouples the first and second transformers from the local loop by activating a deactivated bypass relay.

7. The system of claim 5, wherein the DCP upon receiving control signals from the central office, couples the first and second transformers to the local loop by deactivating an activated bypass relay.

8. A method of improving transmission of digital subscriber line (DSL) signals over a local loop, comprising:
  configuring a loop extender with
    a plurality of upstream complex impedances coupled in parallel;
    a plurality of downstream complex impedances coupled in parallel;
    a plurality of upstream filter and amplifying elements coupled in parallel and coupled in series with the plurality of upstream complex impedances;
    a plurality of downstream filter and amplifying elements coupled in parallel and coupled in series with the plurality of downstream complex impedances; and
  configuring the loop extender with
    a first transformer for coupling the plurality of upstream complex impedances, a first inverting buffer, and one of the plurality of downstream filter and amplifying elements to the local loop; and
    a second transformer for coupling the plurality of downstream complex impedances, a second inverting buffer, and one of the plurality of upstream filter and amplifying elements to the local loop.

9. The method of claim 8, further comprising:
  improving transmission of plain old telephone service (POTS) band signals over the local loop via a POTS loading coil coupled to the local loop; and
  providing communications, control, and diagnostic functionality via a diagnostic and control unit coupled to the local loop.

10. The method of claim 9, wherein providing communications, control, and diagnostic functionality comprises:
  communicating with a central office via a modem coupled to the local loop;
  processing control signals received via the modem;
  selecting one of the plurality of downstream complex impedances based upon the processed control signals;
  selecting one of the plurality of upstream complex impedances based upon the processed control signals;
  selecting one of the plurality of upstream filter and amplifying elements based upon the processed control signals; and
  selecting one of the plurality of downstream filter and amplifying elements based upon the processed control signals.

11. The method of claim 10, wherein the method further comprises uncoupling the first transformer and the second transformer from the local loop in accordance with the processed control signals.

12. A system for improving transmission of digital subscriber line (DSL) signals over a local loop, the system comprising:
  selectable line termination and equalization (SLTE) DSL amplification circuitry capacitively coupled to the local loop via bypass relay switches;
  a plain old telephone service (POTS) loading coil adapted to be coupled to the local loop for improving transmission of POTS band signals over the local loop; and
  a diagnostic and control unit coupled to the local loop for receiving and processing control signals from a central office, coupled to the bypass relay switches via a bypass relay for controlling the bypass relay switches, and coupled to the SLTE DSL amplification circuitry via a plurality of switch control lines for controlling the SLTE DSL amplification circuitry.

13. The system of claim 12, wherein the first switch is controlled via a first switch control line, the second switch is controlled via a second switch control line, the third switch is controlled via a third switch control line, and the fourth switch is controlled via a fourth switch control line.

14. The system of claim 13, wherein the diagnostic and control unit-is configured to instruct the first switch to select one of the plurality of complex upstream impedances in response to the control signals received from the central office.

15. The system of claim 14, wherein the one of the plurality of complex upstream impedances selected approximately matches the local loop impedance in a first direction along the local loop.

16. The system of claim 15, wherein the first direction is directed from the SLTE DSL amplification circuitry to the central office along the local loop.

17. The system of claim 13, wherein the diagnostic and control unit is configured to instruct the second switch to select one of the plurality of complex downstream impedances in response to the control signals received from the central office.

18. The system of claim 17, wherein the one of the plurality of complex downstream impedances selected approximately matches the local loop impedance in a second direction along the local loop.

19. The system of claim 18, wherein the second direction is directed from the SLTE DSL amplification circuitry to a customer premises along the local loop.

20. The system of claim 13, wherein the diagnostic and control unit-is configured to instruct the third switch to select one of the plurality of upstream filter and amplifying in response to the control signals received from the central office.

21. The system of claim 20, wherein the one of the plurality of upstream filter and amplifying elements selected is based upon local loop length measured from the SLTE DSL amplification circuitry to a customer premises.

22. The system of claim 13, wherein the diagnostic and control unit, in response to the control signals received from the central office, instructs the fourth switch to select one of the plurality of downstream filter and amplifying elements.

23. The system of claim 22, wherein the one of the plurality of downstream filter and amplifying elements selected is based upon local loop length measured from the SLTE DSL amplification circuitry to the central office.

* * * * *